INVENTOR
HARVEY A. KNELL

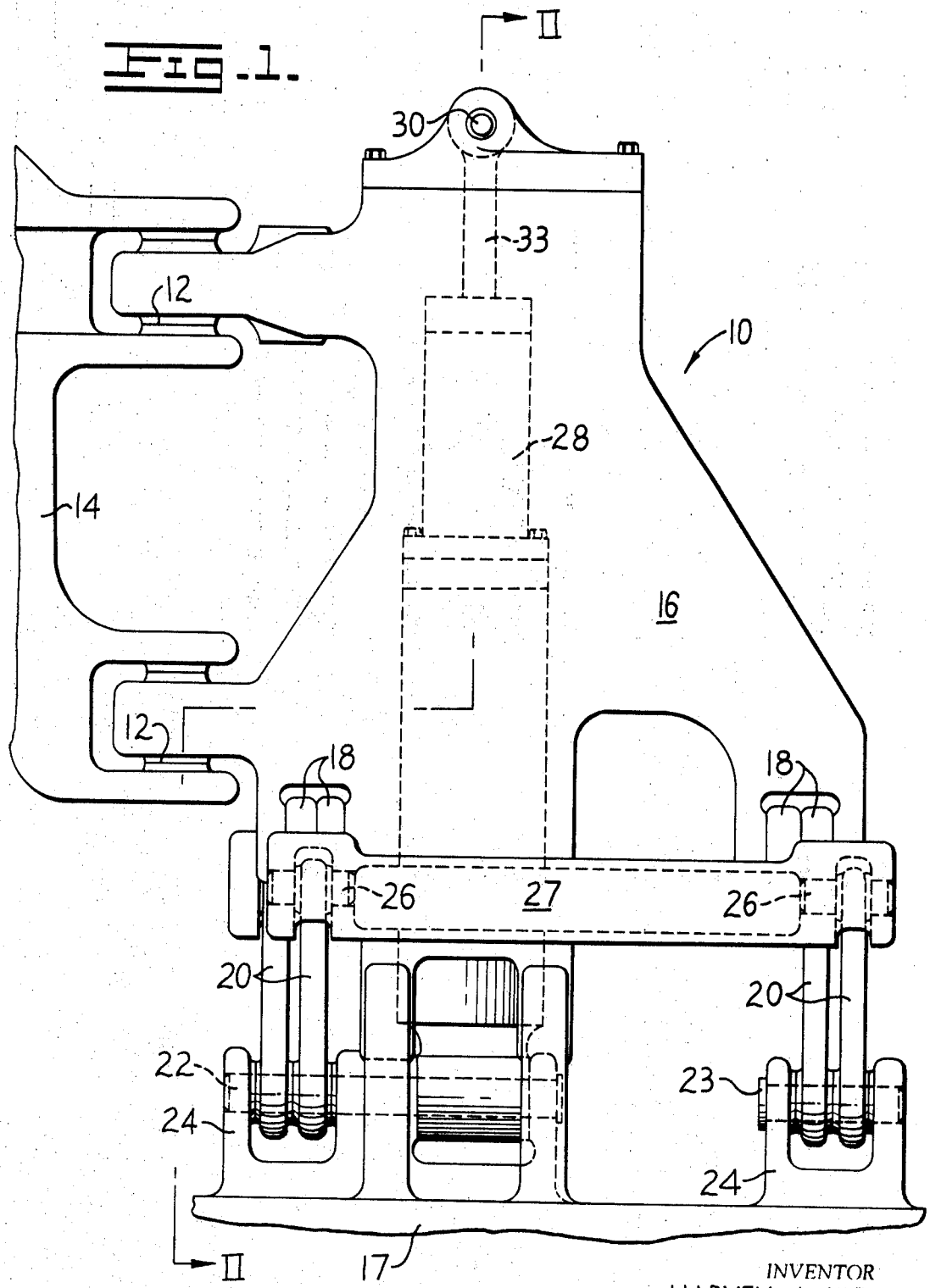

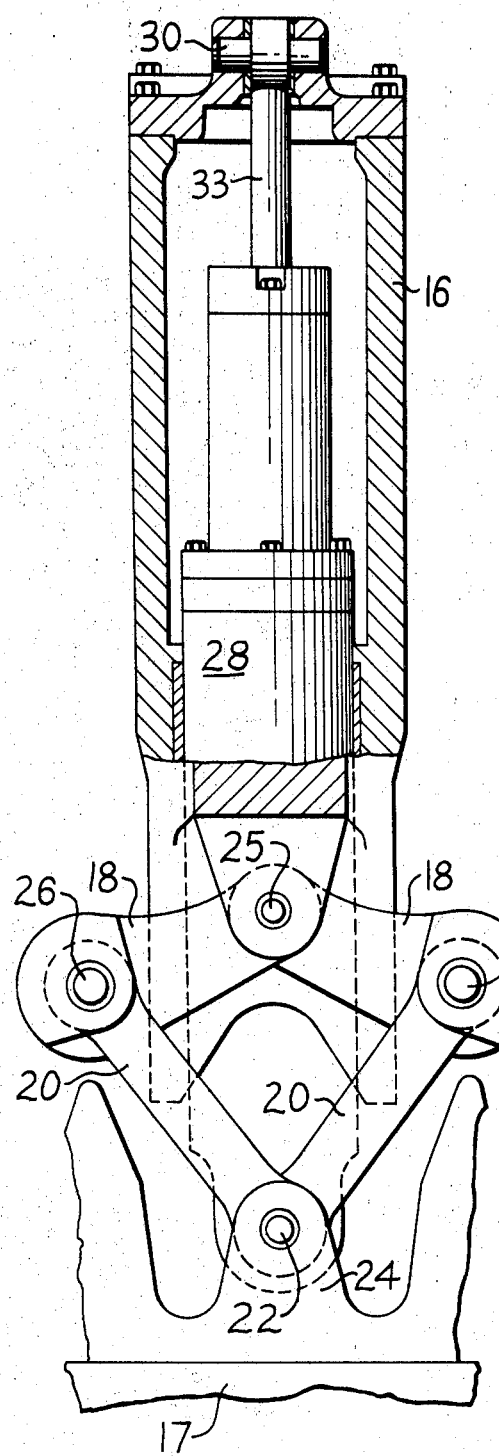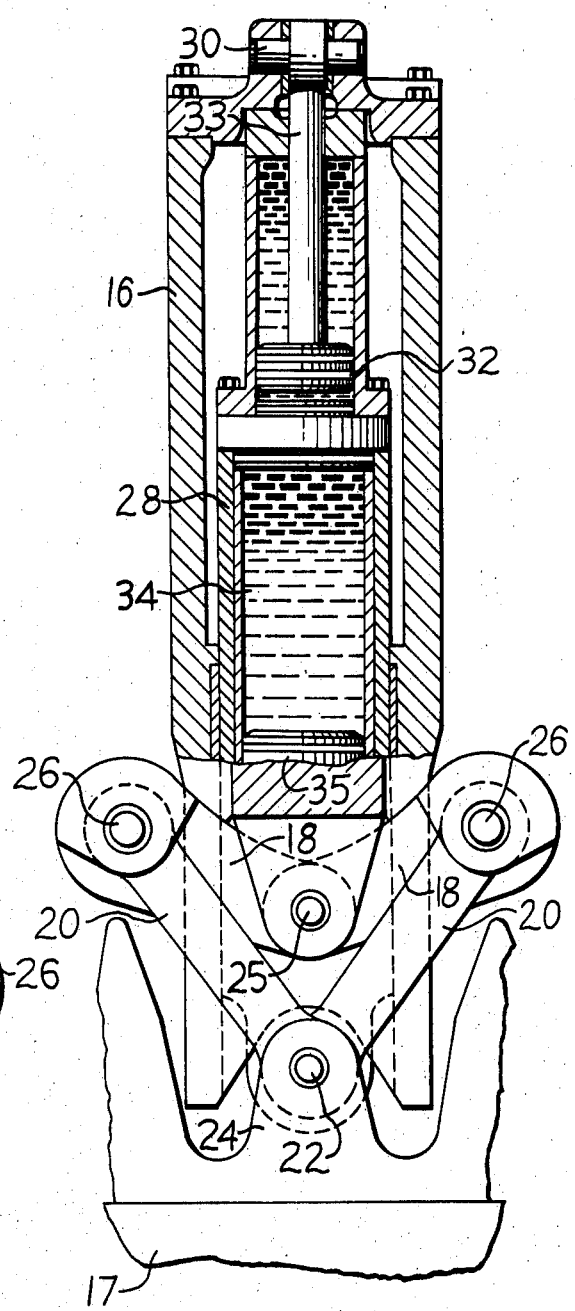

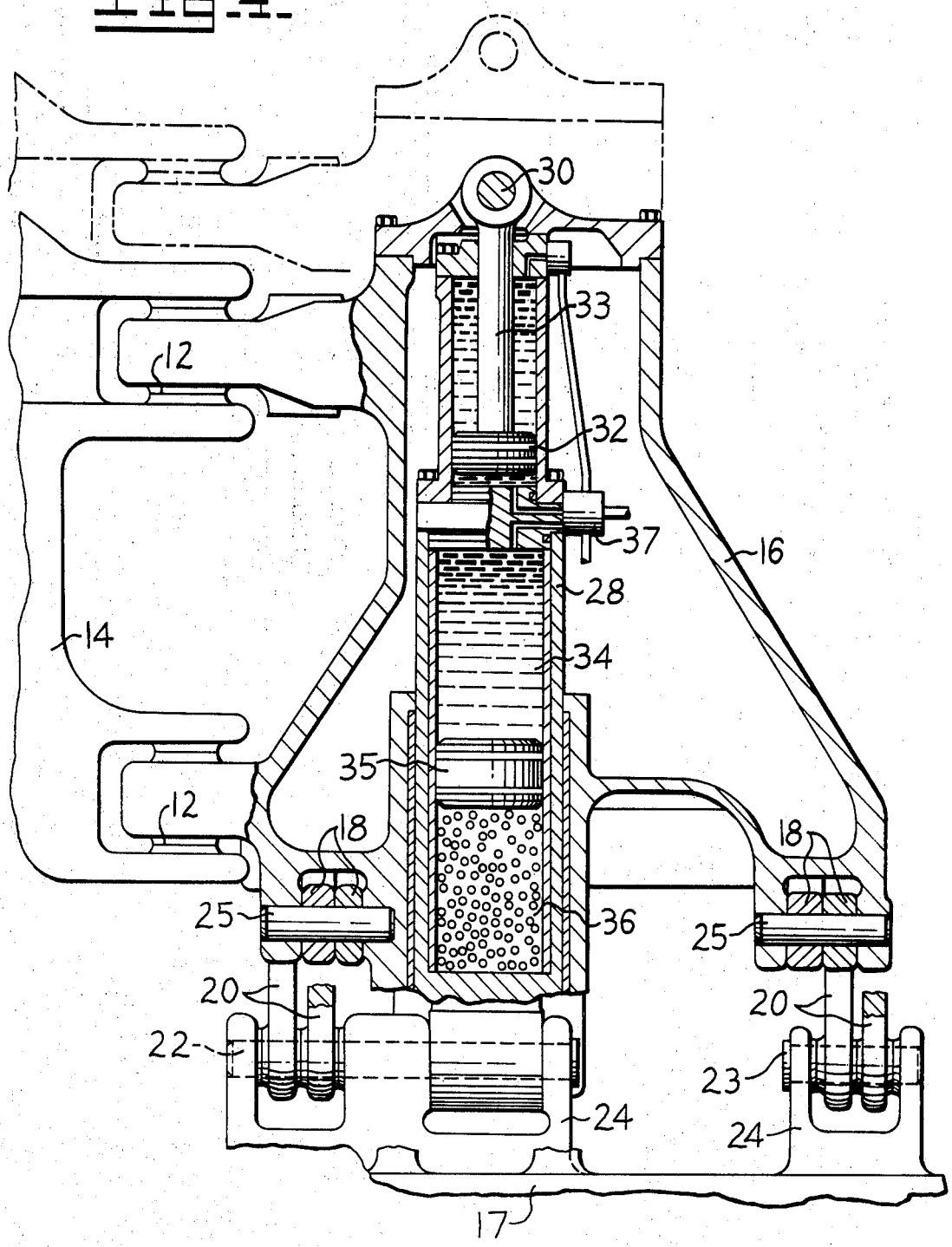

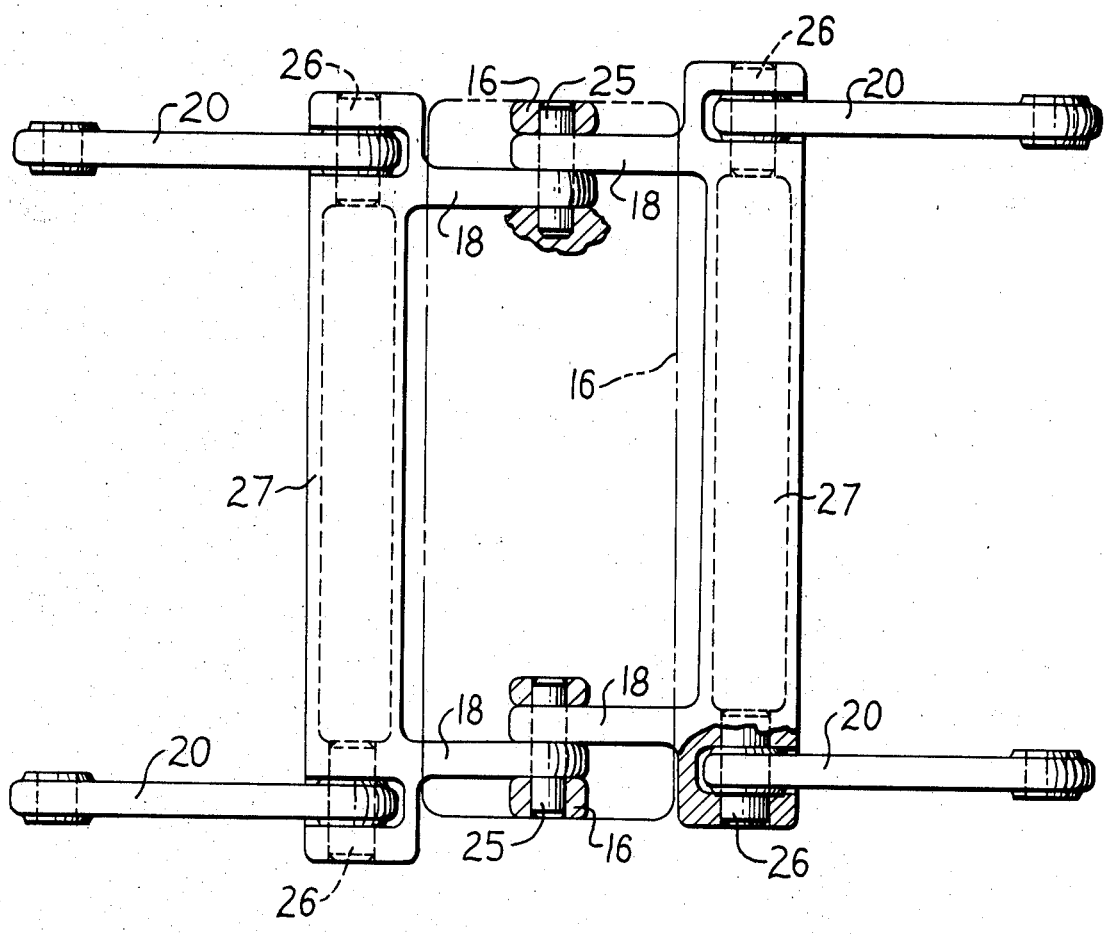

United States Patent Office 3,565,460
Patented Feb. 23, 1971

3,565,460
SYSTEM FOR CONTROL OF BOUNCE IN TRACTOR-TRAILER COMBINATIONS
Harvey A. Knell, Joliet, Ill., assignor to Caterpillar Tractor Co., Peoria, Ill., a corporation of California
Filed Dec. 23, 1968, Ser. No. 786,022
Int. Cl. B60d 1/00
U.S. Cl. 280—483      9 Claims

ABSTRACT OF THE DISCLOSURE

A hitch for a tractor-trailer unit with scissors-type linkages at both the front and rear of the hitch connected by transfer tubes and a strut cushion hitch comprising a single cylinder-accumulator structure. Trailer movement relative to the tractor is restricted to vertical translation and the loads imposed upon the tractor frame are equalized through the linkages.

SUMMARY OF THE INVENTION

This invention relates to improving the riding qualities and reducing stresses in the tractor component of tractor-trailer combinations and particularly such combinations wherein the tractor is of the two-wheel type.

In some two-wheel tractor applications, and particularly in a two-wheel tractor and two-wheel earthmoving scraper combination, the resiliency of the tires and weight of the scraper, suspended between the front and rear wheels of the combination, during a haul at relatively high speed, create an intolerable verticle are bouncing movement. Ordinary shock or vibration absorbers are impractical as a solution to this characteristic bounce because of the unusual size and weight of the equipment and the loads supported by it.

In recent years, the Frahm principle of utilizing secondary vibration systems tuned to cancel the undesirable vibrations of a first system has been used to obviate this problem by precisely tuning the oscillatory frequency of the trailer, thereby effectively eliminating the tractor oscillation.

The U.S. patent to Barton et al., 3,311,389, issued Mar. 28, 1967 and assigned to the assignee hereof, discloses a system which utilizes the Frahm principle. The Barton et al. device significantly improves the riding qualities of the tractor and reduces stress in the structural components of the tractor-trailer combination. In that design, the hitch structure consists of two main components—a bracket which is pivotally connected to the scraper gooseneck, and an A-frame member which is pivotally secured to the tractor frame. These two members are connected by a linkage and a resilient member, which permit several inches of relative movement between the two structures. The bracket member and the A-frame member, due to linkage and resilient member configuration, are required to be designed so as to carry nearly all the load imposed upon the hitch structure, thus making both members relatively massive and expensive.

In this invention, the load path from the tractor to the scraper has been shortened by the use of a single, well-designed structure in which a scissors-type linkage coupled with a shear carrying resilient member permits vertical deflection of the trailer with respect to the tractor, thereby reducing the stresses on the structural members and improving riding qualities. In addition, means are provided which produce automatic leveling and deflection compensation in the spring mechanism, caused by loading and unloading of the scraper.

It is, therefore, an object of this invention to provide a strut cushion hitch for a tractor-trailer combination for controlling vertical bounce of the tractor.

It is also an object of this invention to provide such a hitch utilizing scissors-type linkages, thereby permitting relative vertical movement between the tractor and the trailer.

It is also an object of this invention to provide an extensible connection between a tractor and trailer, together with means for damping and tuning vertical movement between the tractor and trailer.

It is also an object hereof to provide a tuned, resilient, extensible connection between a tractor and trailer.

It is an object of this invention to provide a strut cushion hitch in which scissors linkages are positioned between an A-frame and a tractor frame to shorten the load path between the tractor and the trailer.

It is also an object of this invention to provide such a hitch having a means for damping and tuning vertical movement between the tractor and trailer wherein a load cylinder and an accumulator are mounted in an end-for-end relationship to form a strut type support member, eliminating excessive plumbing and hardware.

It is also an object hereof to provide such a hitch wherein the load cylinder and accumulator are mounted within the hitch structure, thereby reducing space requirements.

It is also an object of this invention to provide such a hitch in which the strut support member is mounted in a box hitch beam structure, thereby transferring into the tractor frame a substantial portion of the horizontal and shearing load imposed upon the hitch assembly.

It is a further object of this invention to provide a strut cushion hitch having scissors-type linkages in the hitch, and incorporating spreader tubes between a plurality of such linkages in order to translate the forces acting upon the hitch structure equally into the tractor frame.

It is still further object of this invention to provide a strut cushion hitch employing means for controlling vertical bounce of the tractor, the hitch employing scissors-type linkages to permit relative vertical movement between the tractor and hitch assembly, and transfer tubes to pass the loads imposed upon the hitch assembly substantially equally through the linkages.

It is a still further object of this invention to provide such a hitch wherein the transfer tubes are concentric.

Other objects and advantages of the present invention will become apparent from the following description and claims as illustrated in the accompanying drawings which, by way of illustration, show a preferred embodiment of the present invention and principles thereof and what is now considered to be the best modes contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWINGS

FIG. 1 is a schematic view in side elevation of the strut cushion hitch of the instant invention;

FIG. 2 is a partial sectional view taken along a line II—II of FIG. 1, illustrating structural relationships of elements of the hitch with maximum vertical displacement between the tractor and trailer;

FIG. 3 is a view similar to FIG. 2, with greater sectional detail, with the structural elements in the position assumed during minimum vertical displacement between the tractor and trailer;

FIG. 4 is a sectional view, similar to FIG. 1, with the elements of the hitch in the position assumed during minimum vertical displacement between the tractor and trailer;

FIG. 5 is a development view of the scissors linkage of the instant invention, with the parts spread so as to show their structural relationships.

DETAILED DESCRIPTION OF THE DRAWINGS

Figure 6:
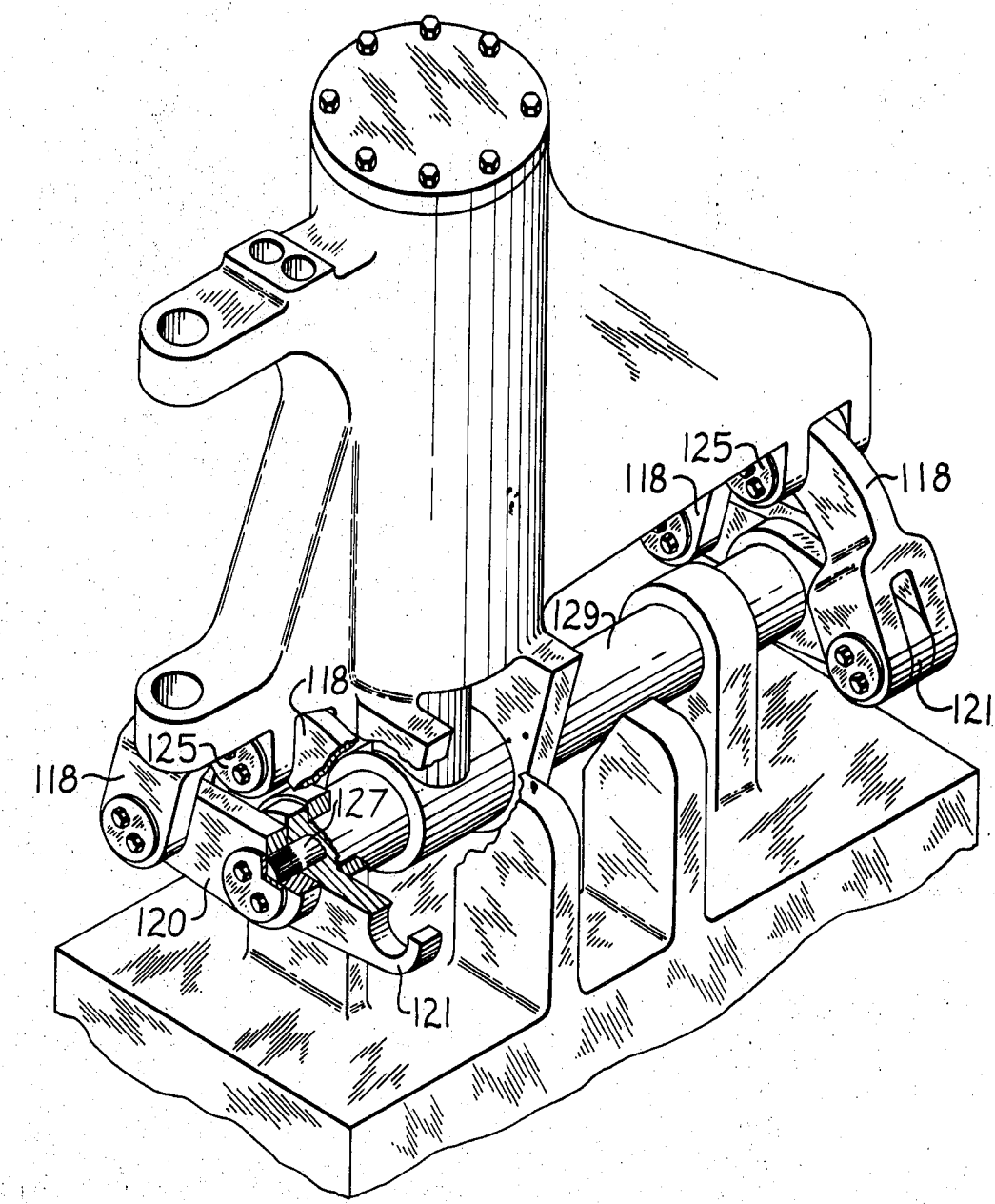
FIG. 6 is a perspective view, partly in section, of an alternate embodiment of the instant invention.

A scraper hitch, generally indicated at 10, is pivotally connected at 12 to the draft assembly of a trailer, a portion of which is shown at 14. For purposes of illustration, it will be assumed that the trailer 14 is a scraper of a known type. However, the instant invention would be applicable to trailers other than scrapers.

The hitch assembly 10 has an A-frame 16, shown supported at the connection 12 with respect to the tractor, a portion of which is shown at 17. The A-frame 16 and the tractor 17 are connected by two parallel sets of links 18 and 20.

As best shown in FIGS. 2 and 3, the links 20 are supported with respect to the tractor by pivot pins 22 and 23 extending through the ends of the links and through brackets 24 on the tractor. The links 18 are pivotally connected to the hitch assembly by pins 25, and links 18 and 20 are joined and pivoted with respect to each other by pivot pins 26.

As best shown in FIG. 5, wherein the links 18 and 20 are illustrated in a development view, i.e., the link assembly is spread to a flat position, links 18 are interconnected by spreader tubes 27 which act as transfer tubes to transfer torsional forces between the linkages so as to act against the tractor frame with equal force on either side of the strut member.

A strut cushion cylinder 28 is pivotally connected to the tractor at pin 22 and to the upper portion of the A-frame by a pin 30. The cylinder is divided into upper and lower cylindrical chambers, with the upper chamber containing a piston 32 and piston rod 33. The cushion cylinder 28 allows oscillation between the tractor and the scraper and hitch assembly, between the limits illustrated by the positions of links 18 and 20 in FIGS. 2 and 3, subject to controlled movement of the piston 32 within the upper chamber of the cylinder 28.

The lower chamber 34 of the cylinder is an accumulator which contains a floating piston 35 and a fluid cushioning medium 36 in the form of a suitable compressed gas, such as nitrogen. That portion of chamber 34 between pistons 32 and 35 is charged with oil under pressure. The control of the fluid entering the cylinder 28 is performed, via a lockout valve 37, by any suitable hydraulic circuit, such as that disclosed in the Barton et al. patent, 3,311,389. With the parts in the mid-position as illustrated in FIG. 1, the entire heavy mass, including the scraper and draft connections, is free to oscillate to an extent which is limited and cushioned by the compressed gas below piston 35.

The acceleration of the tractor, resulting from the passage of the equipment over uneven terrain, is opposed by the weight of the scraper exerted through the strut and scissors linkage assembly. Thus, as the entire tractor-trailer assembly tends to bounce or oscillate as a primary mass, the scraper itself acts as a suspended secondary mass.

The vibration rate of the scraper may be tuned by changing the spring rate which tunes the secondary mass, to moderate the vibration of the primary mass. In this application the spring rate may be changed by adjusting the volume and pressure of gas in the accumulator chamber.

The hitch member is a highly stressed apparatus and particular attention must be paid to the strength of the mechanism and its ability to withstand the various loads and stresses to which it is subjected. It must support the weight of the scraper, carry bending loads resulting from rim pull, and resist torsional loads imposed by the steering jacks of the two axial tractor-trailer combination; this includes the steering effect of hitting a bump with one wheel. Each of these loads impart a force on the hitch structure which, under ideal conditions, is transferred into the frame of the tractor in as short a path as possible. The described design transfers the forces directly through the scissors links and into the tractor frame. In this design the load path is through only one member, A-frame 16, with member having a deep section and therefore highly efficient in resisting bending. The subject hitch is also efficient for transmitting torsional loads due to its relatively large box beam section and the transfer tubes 27 between linkages provide a more even transmittal of loads, imposed upon the hitch member, into the tractor frame.

Referring now to the embodiment shown in FIG. 6, a cushion hitch with concentric transfer members is disclosed. This design has substantially the same action as the previously described embodiment, except that the transfer tubes are mounted on a longitudinal center line of the tractor, and one is inside the other.

Links 118, which are pivotally secured to the hitch member 125, have bifurcated ends thereon and are pivotally secured to either links 120 or 121. Links 120 are secured to a central transfer shaft 127 and links 121 are secured to a transfer tube 129 concentric with shaft 127.

Normal relative movement of the hitch A-frame member 116 relative to the tractor results in relative movement of the transfer tube and shaft. Unequal loads introduced into the hitch structure, however, twist the transfer tube and shaft in such a manner that the loads are translated evenly into the tractor frame.

The strut cylinder in this design is similar to that described in the preferred embodiment and is pivotally secured about the transfer members.

Thus the applicants have provided an improved strut cushion hitch which is stronger and less expensive than those previously available. While illustrated and described in two preferred embodiments, the invention is capable of variation and modification within the purview of the following claims. For example, either of the two embodiments could be utilized with a load cylinder of simple construction like that described and disclosed in U.S. Pat. No. 3,311,389 with the accumulators mounted externally. Other modifications and variations within the scope of the claimed invention will be readily obvious to those skilled in the art.

What is claimed is:

1. A system for controlling bounce at the articulated connection between vehicle components comprising a first pivot member on a tractor member of said components and a second pivot member on a trailer member of said components, a plurality of links pivoted on each of said pivot members, and each of the links pivoted on said first pivot member being pivotally connected to a corresponding link pivoted on said second pivot member, and similar pairs of links mounted on a third pivot member of the tractor and a fourth pivot member on the trailer, being spaced from those on said first and second pivot members, thereby forming a scissors-type joint between said tractor member and said trailer member, and a cylinder pivotally connected between said tractor member and said trailer member and means providing fluid pressure in said cylinder for damping and tuning the vertical movement between said tractor and trailer.

2. The system of claim 1 wherein said links which are pivoted together extend transversely of said vehicle, with pairs of links extending alternately from said pivot members.

3. The system of claim 1 wherein means interconnect pairs of links on said first and second pivot members to corresponding pairs of links on said second and third pivot members.

4. The system of claim 1 wherein said cylinder comprises a portion of a strut type support system wherein said cylinder contains a first chamber in which a piston and piston rod are motivated by fluid pressure, and a second accumulator, chamber.

5. In a hitch for a tractor-trailer combination, said hitch being pivotally mounted on said trailer, a plurality of transversely spaced first links on said hitch, an equal plurality of transversely spaced second links on the tractor, means pivotally connecting each of said first links to one of said second links, means interconnecting such connected pairs of links to corresponding pairs of links and a strut cushion cylinder pivotally connected to said hitch and said tractor.

6. The hitch of claim 5 wherein said pairs of links extend, alternately, in opposite directions and said interconnecting means are attached to said pairs of links and said corresponding pairs of links at the pivotal connecting means thereof.

7. The hitch of claim 5 wherein adjacent pairs of links and adjacent corresponding pairs of links extend in opposite directions, forming scissors-type joints between said hitch and said tractor.

8. The hitch of claim 7 wherein all of the links pivoted on one part of said combination are pivoted on concentric pivot means.

9. The hitch of claim 8 wherein the links extending in one direction are pivoted on a first concentric pivot means and the links extending in the opposite direction are pivoted on a second concentric pivot means.

References Cited

UNITED STATES PATENTS

| | | | |
|---|---|---|---|
| 2,928,684 | 3/1960 | Geiger | 280—425 |
| 2,953,410 | 9/1960 | Chaney | 280—425X |
| 3,014,739 | 12/1961 | Kress | 280—489 |
| 3,118,686 | 1/1964 | McAdams | 280—65 |
| 3,135,529 | 6/1964 | Conrad | 280—489 |
| 3,311,389 | 3/1967 | Barton et al. | 280—489 |
| 3,321,216 | 5/1967 | Carter | 280—489 |
| 3,430,657 | 3/1969 | Junck et al. | 280—489X |
| 3,449,845 | 6/1969 | Jessen et al. | 37—129 |

FOREIGN PATENTS

| | | | |
|---|---|---|---|
| 529,361 | 9/1921 | France | 280—446 |

LEO FRIAGLIA, Primary Examiner

U.S. Cl. X.R.

280—492